United States Patent
Marozau et al.

(10) Patent No.: US 10,437,334 B2
(45) Date of Patent: Oct. 8, 2019

(54) METHOD AND WEARABLE APPARATUS FOR SYNCHRONIZING A USER WITH A VIRTUAL ENVIRONMENT

(71) Applicant: VR ELECTRONICS LIMITED, London (GB)

(72) Inventors: Dzmitry Marozau, Scotland (GB); Siarhei Khurs, Brest (BY); Raman Aleksandrovich, Minsk (BY)

(73) Assignee: VR ELECTRONICS LIMITED, London (GB)

( * ) Notice: Subject to any disclaimer, the term of this patent is extended or adjusted under 35 U.S.C. 154(b) by 321 days.

(21) Appl. No.: 14/905,094

(22) PCT Filed: Aug. 6, 2014

(86) PCT No.: PCT/EA2014/000017
§ 371 (c)(1),
(2) Date: Jan. 14, 2016

(87) PCT Pub. No.: WO2015/007296
PCT Pub. Date: Jan. 22, 2015

(65) Prior Publication Data
US 2016/0266645 A1    Sep. 15, 2016

(30) Foreign Application Priority Data

Jul. 15, 2013   (EA) .................................. 201301064

(51) Int. Cl.
| | |
|---|---|
| *G06F 3/01* | (2006.01) |
| *G06F 1/16* | (2006.01) |
| *H04B 1/3827* | (2015.01) |
| *G06F 13/10* | (2006.01) |
| *G06T 19/00* | (2011.01) |
| *G09G 5/12* | (2006.01) |

(52) U.S. Cl.
CPC .............. *G06F 3/016* (2013.01); *G06F 1/163* (2013.01); *G06F 3/011* (2013.01); *G06F 3/014* (2013.01);
(Continued)

(58) Field of Classification Search
CPC ........ G06F 3/016; G06F 13/102; G06F 3/014; G06F 1/163; G06F 3/011; G06F 3/015; H04B 1/385; G09G 5/12; G06T 19/006
(Continued)

(56) References Cited

U.S. PATENT DOCUMENTS

| | | |
|---|---|---|
| 5,583,478 A | 12/1996 | Renzi |
| 5,963,891 A | 10/1999 | Walker et al. |

(Continued)

FOREIGN PATENT DOCUMENTS

RU        4173 U1    5/1997

*Primary Examiner* — Hirdepal Singh
(74) *Attorney, Agent, or Firm* — Sughrue Mion, PLLC

(57) ABSTRACT

The proposed method relates to the field of providing physical feedback to a user from a virtual application, particularly a computer game or other software applications. The method for interactive physiological and technological synchronization of a user with a virtual environment includes taking the user's biometric and/or kinematic parameters, transferring the user's biometric and/or kinematic parameters to an application program, generating feedback signals in the application program, transmitting the feedback signals to a computing device, processing the feedback signals and supplying feedback pulses which invoke physical sensations in the nervous system of the user through contact with the user's skin, wherein the feedback pulses are supplied using the principle of cascaded distribution of electrical pulses. Also claimed are variants of a wearable apparatus for implementation of the proposed method. The proposed method and apparatus allow for creating a deep-sense reality for the user.

20 Claims, 7 Drawing Sheets

Figure 1:
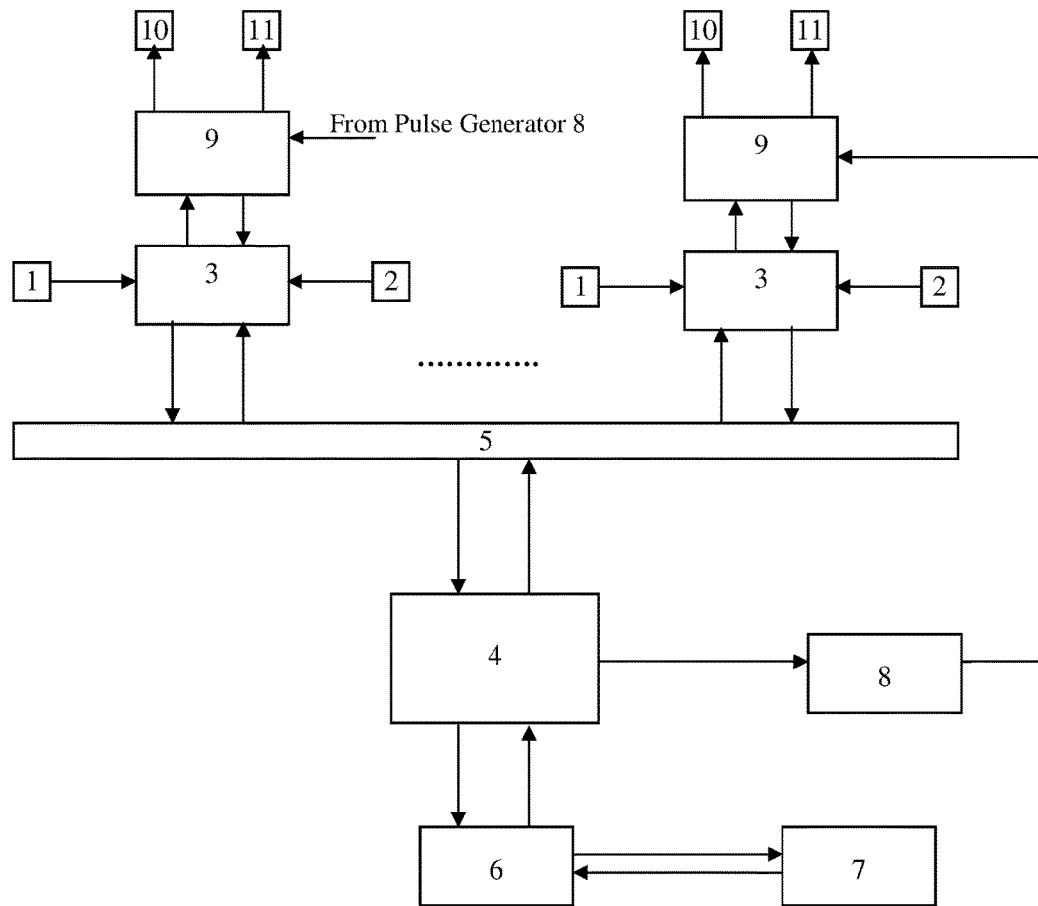

(52) U.S. Cl.
CPC ............ G06F 3/015 (2013.01); G06F 13/102 (2013.01); G06T 19/006 (2013.01); G09G 5/12 (2013.01); H04B 1/385 (2013.01)

(58) Field of Classification Search
USPC ...................................................... 340/407.1
See application file for complete search history.

(56) References Cited

U.S. PATENT DOCUMENTS

| | | | | |
|---|---|---|---|---|
| 6,930,590 | B2* | 8/2005 | Ling | G06F 3/016 310/319 |
| 9,411,780 | B1* | 8/2016 | Awad | G06Q 50/01 |
| 9,904,356 | B2* | 2/2018 | Laughlin | G06F 3/017 |
| 2005/0113167 | A1* | 5/2005 | Buchner | A63F 13/02 463/30 |
| 2009/0023554 | A1* | 1/2009 | Shim | A63B 22/02 482/4 |
| 2010/0103075 | A1* | 4/2010 | Kalaboukis | A63F 13/02 345/8 |
| 2014/0070957 | A1* | 3/2014 | Longinotti-Buitoni | A61B 5/02055 340/870.01 |
| 2016/0187974 | A1* | 6/2016 | Mallinson | G06F 3/014 463/32 |
| 2017/0106277 | A1* | 4/2017 | Perdigon Rodriguez | G06F 3/011 |
| 2017/0115742 | A1* | 4/2017 | Xing | G06F 3/012 |
| 2017/0332979 | A1* | 11/2017 | Nagisetty | A61B 5/7282 |
| 2018/0081439 | A1* | 3/2018 | Daniels | G06F 1/163 |

* cited by examiner

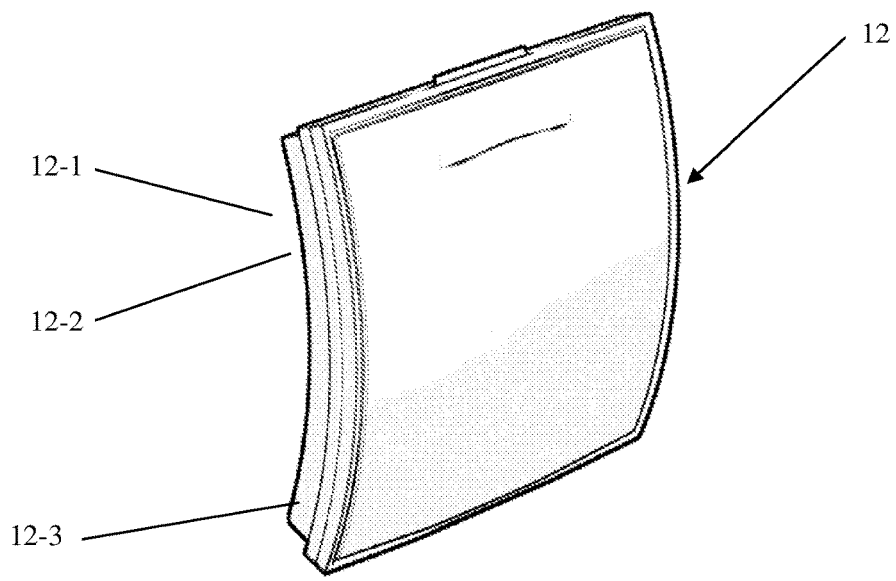
FIG. 5
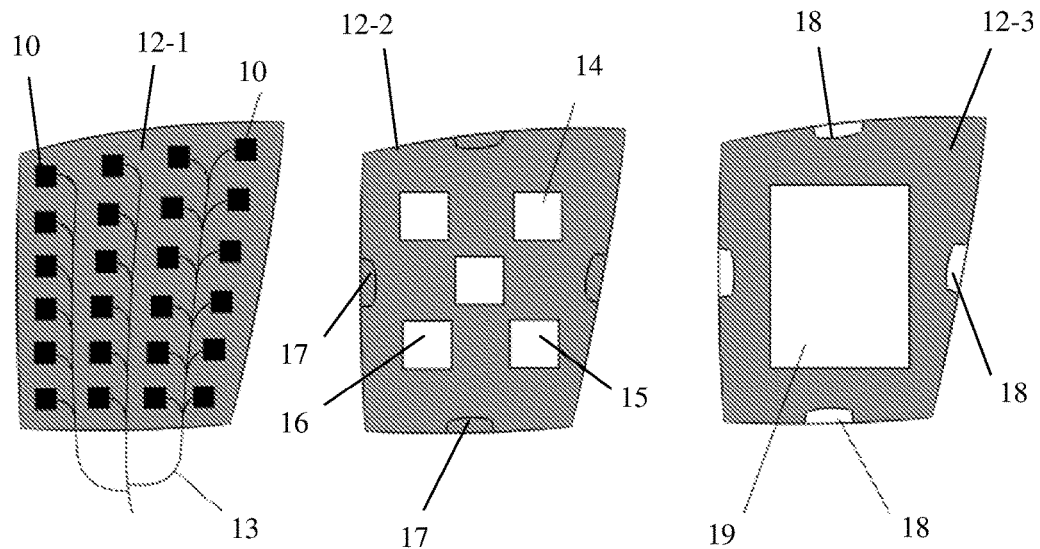
FIG. 6     FIG. 7     FIG. 8

METHOD AND WEARABLE APPARATUS FOR SYNCHRONIZING A USER WITH A VIRTUAL ENVIRONMENT

CROSS-REFERENCE TO RELATED APPLICATIONS

This application is a U.S. national stage application of an international application PCT/EA2014/000017 filed on 6 Aug. 2014, whose disclosure is incorporated herein in its entirety by reference, which international application claims priority of a patent application EA201301064 filed on 15 Jul. 2013.

FIELD OF THE INVENTION

The present invention belongs to the field of providing physical feedback to a user from a virtual application, a computer game or other program applications in particular.

BACKGROUND OF THE INVENTION

The development of information technology allowed creating technical and psychological phenomena that are called "virtual reality" or "VR-systems" in scientific literature. The development of programming technique, the fast increase in semiconductor integrated circuit throughput, the development of special facilities for transmitting information to a user and getting feedback provided a person who gets into a virtual world with a new quality of perception and gave him an opportunity to not only observe and experience, but also act on his own.

A comprehensive VR-system must possess the following properties: it replies to the actions of a user (is interactive), it introduces a 3D-graphics virtual world on a real time basis and produces an immersion effect by means of a sensuous connectivity system. For this purpose the system and the user must be fully synchronized.

At present there are a large number of VR-systems that provide interactivity and a realistic physical feedback in a virtual environment.

The most close related art (herein called "prototype") of the present invention is a method for transferring physical sensations to the body of a user through feedback from an application program. The method includes generating feedback signals in an application program, transmitting feedback signals to a wearable receiver and transmitting physical feedback sensations based on the feedback signals received to the body and/or the head of the user, using the user's skin as an interface, and a wearable accessory for the method. The accessory is equipped with various mechanical and electrical triggers for generating multi-sensory feedback from a virtual environment and various biometric and environmental sensors. The main control panel of the application software and various monitoring tools regulated by the user depending on the layers of the wearable accessory control the intensity of the tactile senses being stimulated.

The disadvantage of the aforementioned invention is an insufficiently sensible adjustment of feedback pulses received from one or another type of interference. Manual "less-more" settings change is the extent of the adjustment. General adjustment sets a certain pattern of pulse behavior, the pattern being identical for all interfering objects. The impacts of pulses are selective and don't transmit full range of physical sensation from various types of interference with various objects and mediums in a virtual environment.

OBJECT AND BRIEF SUMMARY OF THE INVENTION

The object of the present invention is to create a deep-sense reality through a sufficiently sensible adjustment of feedback pulses' behavior; to transmit any change in virtual environment to the level of user's sensory perception with getting a maximum feeling experience of the occurring events; to establish an instant direct (feedforward) and feedback connections between the user and the digital environment intelligence in an interactive mode; to establish a maximum possible immersion in the gaming or simulation process; to create a proper digital double.

The aforementioned object is achieved in the following way. An inventive method is proposed for interactive physiological and technological synchronization of a user with a virtual environment that includes: taking the user's biometric and/or kinematic parameters, transferring the user's biometric and/or kinematic parameters to an application program, generating feedback signals in the application program, transmitting the feedback signals to a computing device, processing the feedback signals and supplying feedback pulses which invoke physical sensations in the nervous system of the user through contact with the user's skin, wherein the feedback pulses are supplied using the principle of the cascaded distribution of electrical pulses.

For implementation of the inventive method, a wearable apparatus is proposed for the interactive physiological and technological synchronization of a user with a virtual environment, one of the variants of which comprises at least one module containing at least one element for collecting biometric and/or kinematic parameters of the user and/or at least one element for supplying electrical feedback pulses and at least one slot for connecting at least one working unit selected from the following group:
 a device for collecting biometric and/or kinematic parameters of a user;
 a device for supplying electrical feedback pulses;
 a computing device unit;
 an electrical pulse generating unit;
 power supply unit;
 a unit for coupling with an application program;
 a unit for coupling with a mobile device that functions as a display and/or a remote program control console; and
 a localization unit,
wherein the module is made in the form of a flexible plate consisting of three layers, while the elements for collecting biometric and/or kinematic parameters and/or the elements for supplying electrical feedback pulses are placed on the outer side of the layer being in contact with the user's skin, and the slot for connection of working units is placed on the outer side of the external layer.

The second option for implementation of the inventive method is a wearable apparatus for the interactive physiological and technological synchronization of a user with a virtual environment comprises at least one element for collecting biometric and/or kinematic parameters of a user and/or at least one element for supplying electrical feedback pulses and at least one slot for connecting at least one working unit selected from the following group:
 a device for collecting biometric and/or kinematic parameters of a user;
 a device for supplying electrical feedback pulses;
 a computing device unit;
 an electrical pulse generating unit;
 a power supply unit;
 a unit for coupling with an application program;

a unit for coupling with a mobile device that functions as a display and/or a remote program control console; and
a localization unit, wherein the wearable apparatus is an elastic shell capable of adjusting to fit the user's body, wherein the layer being in contact with the user's skin is electrically conductive, while the elements for collecting biometric and/or kinematic parameters and/or the elements for supplying electrical feedback pulses are placed on the electrically conductive layer on the side being in contact with the body of the user.

The wearable apparatus might be made in the form of a piece of clothing that consists of an elastic shell or of modular plates that are linked with elastic material.

A preferable device for coupling with an application program is a wireless communication module or a wired communication port, a USB or a COM-interface in particular.

A preferable localization device is a GPS module or an echolocation module, a system of laser emitters, or a multi-modular 3D system.

The present invention allows for providing full-featured synchronization and creating a deep-sense reality; transmitting any change in virtual environment to the level of the user's sensory perception with getting maximum experience of the events; establishing instant interactive direct connection and feedback between the user and the digital environment intelligence; providing a maximum immersion in gaming or simulation process; creating a proper digital double (twin).

DESCRIPTION OF DRAWINGS OF THE INVENTION

The invention is illustrated in the following drawings.

FIG. 1. An overall scheme (flow chart) of the inventive method for the interactive physiological and technological synchronization of a user with a virtual environment.

Figure 2:
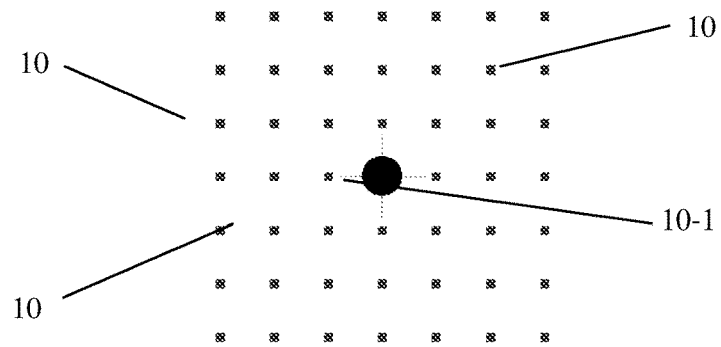
Figure 3:
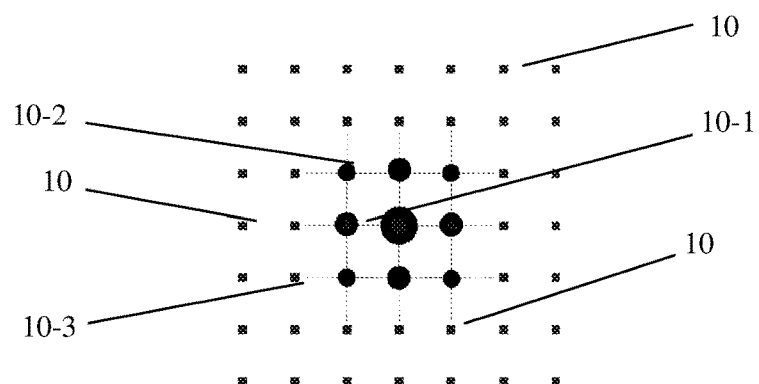
Figure 4:
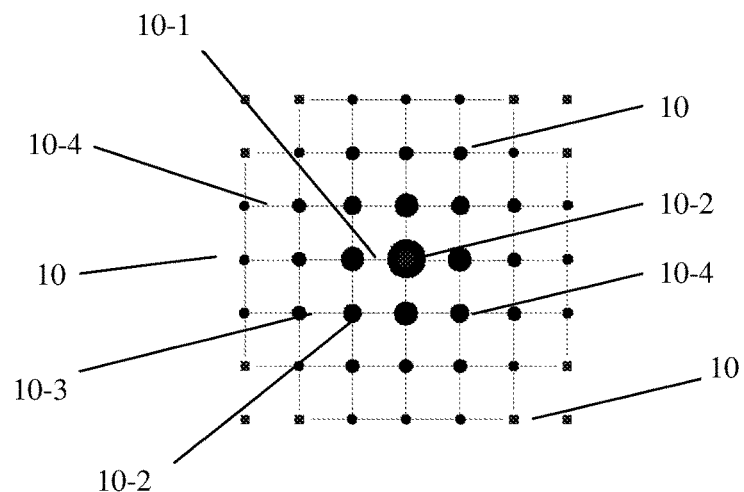

FIG. 2. Cascaded system of electrical pulses distribution, step 1;

FIG. 3. Cascaded system of electrical pulses distribution, step 2;

FIG. 4. Cascaded system of electrical pulses distribution, step 3;

FIG. 5. General view of the invention in the form of a flexible three-layer plate.

FIG. 6. View of the first layer of the flexible plate in contact with the user's skin.

FIG. 7. View of the inner layer of the flexible plate.

FIG. 8. View of the outside layer of the flexible plate.

Figure 9:
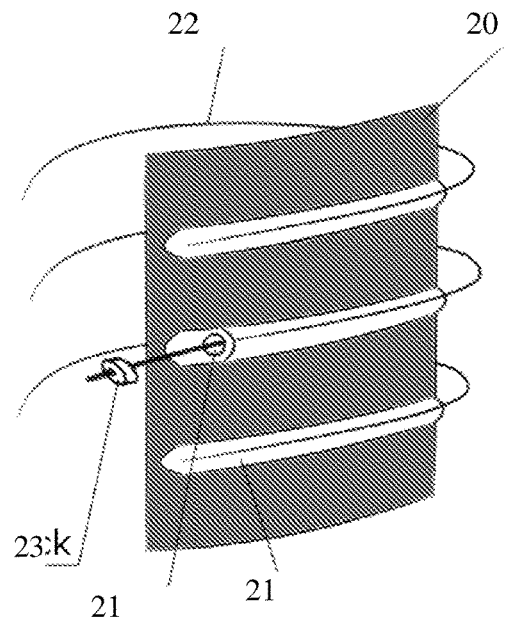

FIG. 9. View of the outer side of the wearable apparatus in the form of a flexible cover.

Figure 10:
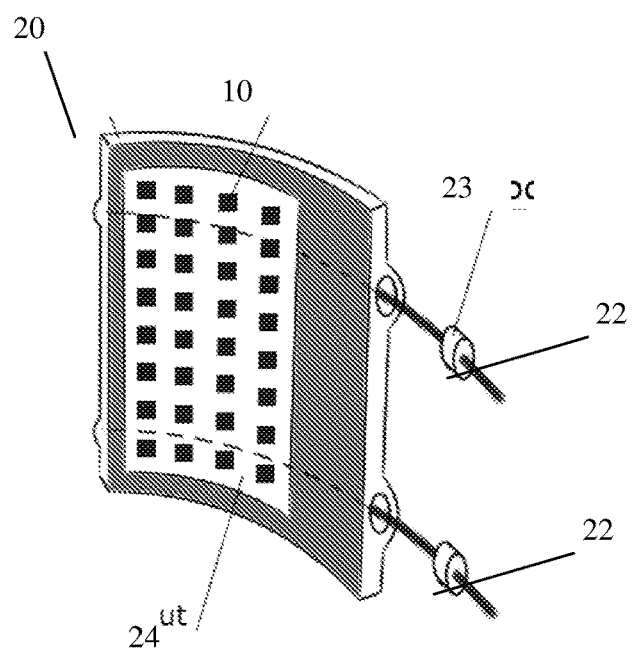

FIG. 10. View of the inner side of the wearable apparatus in the form of a flexible cover.

Figure 11:
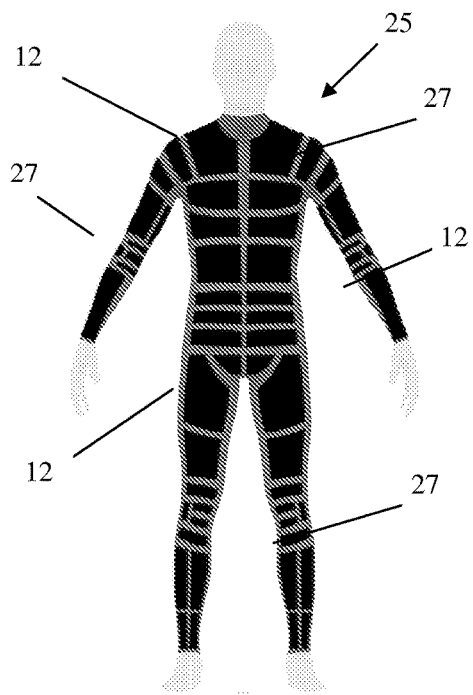

FIG. 11. Wearable apparatus in the form of a modular suit, front view.

Figure 12:
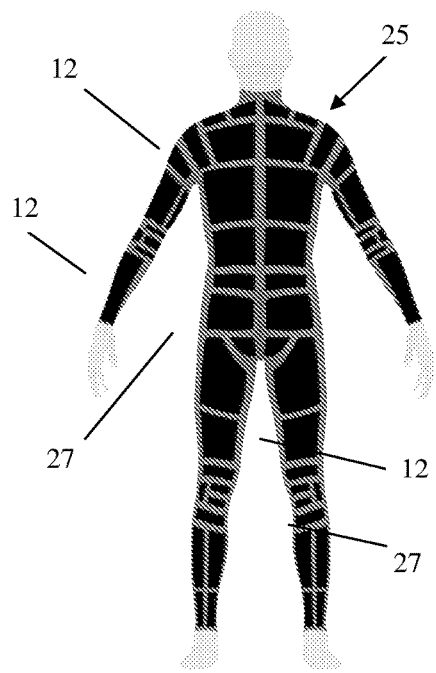

FIG. 12. Wearable apparatus in the form of a modular suit, end view.

Figure 13:
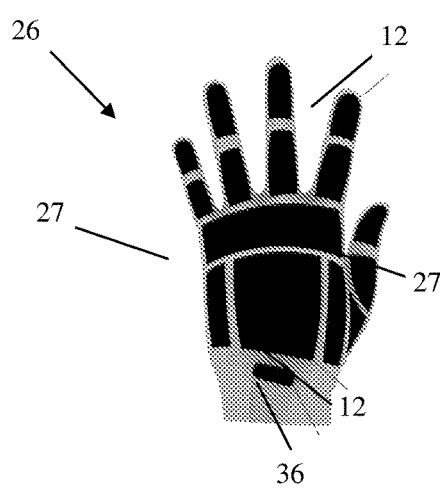

FIG. 13. Modular glove-manipulator, view from the outer side of the palm.

Figure 14:
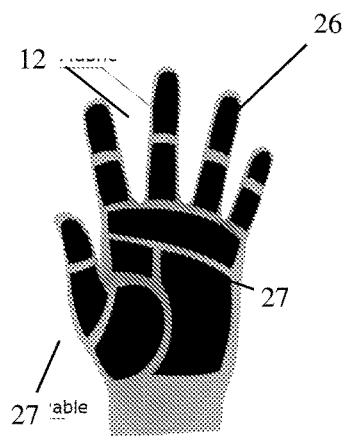

FIG. 14. Modular glove-manipulator, view from the inner side of the palm.

Figure 15:
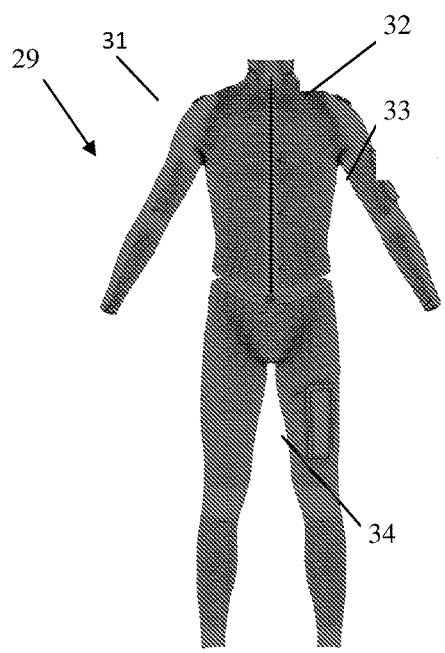

FIG. 15. Wearable apparatus in the form of a flexible cover-suit, front view.

Figure 16:
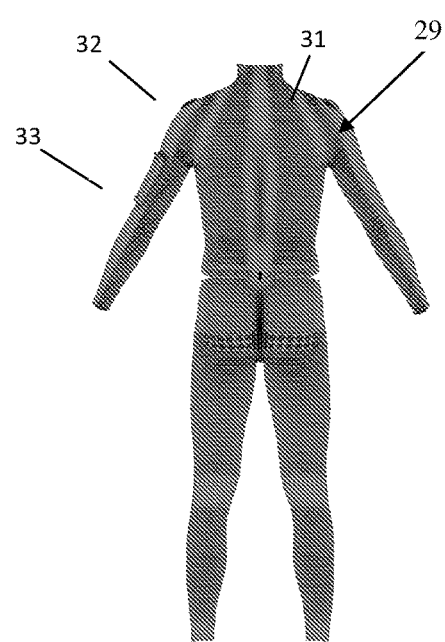

FIG. 16. Wearable apparatus in the form of a flexible cover-suit, end view.

Figure 17:
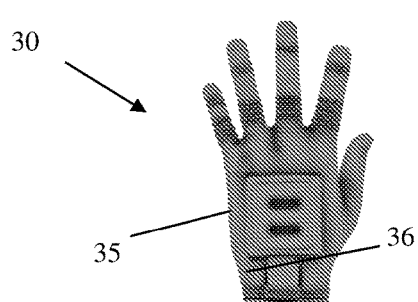

FIG. 17. Flexible cover glove-manipulator, top view.

Figure 18:
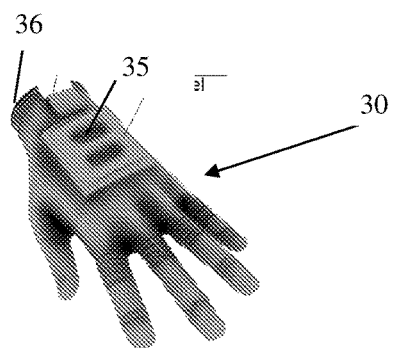

FIG. 18. Flexible cover glove-manipulator, view from the inner side of the palm.

Figure 19:
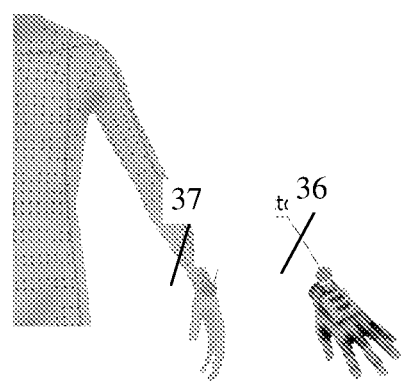

FIG. 19. Junction between the suit and the glove-manipulator.

DESCRIPTION OF PREFERRED EMBODIMENTS OF THE INVENTION

In FIG. 1 the flowchart of the inventive method for the interactive physiological and technological synchronization of a user with a virtual environment is presented.

According to the method, elements 1 for collecting biometric parameters and element 2 for collecting kinematic parameters collect biometric and kinematic parameters of a user and transfer them to devices 3 for collecting parameters. Devices 3 for collecting parameters process the parameters received into signals that are transferred to common computing device 4 with which they are linked by common bus 5. The computing device 4 transfers the burst of signals received through coupling unit 6 to application program launched on a remote data processing unit 7. The application program generates feedback signals and transfers them through the coupling unit 6 to the computing device 4 which processes the feedback signals received and transfers instructions to pulse generator 8 that generates feedback pulses and transfers them to devices 9 for supplying electrical feedback pulses. Devices 9 for supplying electrical feedback pulses supply feedback pulses to feedback pulse supplying elements 10 (hereinafter—electrodes) and/or Peltier elements 11.

The feedback pulses affect nerve endings, which causes muscles or groups of muscles to contract. When a virtual body area of a user meets a virtual object in a virtual environment the application program generates feedback signals and transfers them through the coupling unit 6 to the computing device 4 that generates correspondent instructions for the pulse generator 8 which supplies generated pulses through devices 9 for supplying electrical feedback pulses to electrodes 10 and Peltier elements 11 that are situated in the same area of the actual body of the user.

To ensure the most realistic feedback, signals are provided to the user; electrodes 10 and Peltier elements 11 are supplied with pulses of various amplitude, frequency and stress using the principle of the cascaded distribution of pulses.

In FIGS. 2, 3, and 4, the "soft" electrical pulse distribution principle is presented where the pulses have a various power range—from a stronger to a weaker one and to a complete attenuation.

In FIG. 2, a random electrode 10 system area on the user's body is presented, with the strongest pulse taking place at contact point 10-1.

In FIG. 3, a primary electrical pulse at electrode contact point 10-1 has the most power and is the place of the most intense stimulation. Power of the pulse is calculated electronically and depends on the type of impact in a virtual environment. The power level is picked from a numeric value library sorted in accordance with the types of impact.

A secondary electrical pulse at electrode contact point 10-2 and tertiary at contact point 10-3 are less powerful and are calculated by the software depending on the power of the primary pulse 10-1. The pulse is softened automatically by a required pre-programed value.

In FIG. 4, the signal is distributed decreasingly, reaching its ground potential at electrode contact point 10-4.

Therefore the cascaded distribution provides the most realistic sensing system.

An intellectual array of electrical pulses allows for transferring complex tactile senses while stimulating residual and secondary sensations.

To provide rational energy consumption, the electrodes operate using the principle of catenation. For example, for supplying pulse to ten electrodes, the pulse is initially supplied to the first electrode, then removed from it and then supplied to the second electrode and so forth. All these are very high-frequency operations and an impression of all electrodes pulsing is created.

For implementation of the claimed method, the present invention envisages two variants of wearable apparatus.

An example of one of the variants is a module made in the form of a flexible three-layer plate 12 (FIG. 5) that includes three working layers (FIG. 6-8). The inner layer 12-1 (FIG. 6) in contact with the user's skin comprises a set of electrodes 10 that are connected by wire 13, and/or Peltier elements (not presented in the drawings), and/or biometric, and/or kinematic sensors (not presented in the drawings). The inner layer 12-2 (FIG. 7) comprises a set of contacts 14 of the electrodes, a set of contacts 15 of the common bus, a set of contacts 16 of the working units, and latches 17.

The inner side of the third layer 12-3 (FIG. 8) comprises matching latches 18, contacts inversed to the ones of the second layer (not presented in the drawings), while the outer side has a slot for connecting working units.

The module can have one, two layers, or be multilayered.

An example of the second variant for the wearable apparatus in the invention is an elastic shell 20 (FIG. 9, 10). On the outer side of the shell 20 (FIG. 9) there are notches 21, in which enforcement ribs 22 are inserted with fixing rods 23 at their ends. The enforcement ribs 22 and the fixing rods 23 form a tie-down system for adjusting the fit of the elastic shell 20 against the body of a user.

On the inner side of the elastic shell 20 (FIG. 10) an electrically conductive coating 24 is layered that is contacting the body of the user. On the electrically conductive coating 24 electrodes 10 and/or Peltier elements (not presented in the drawings) are layered.

One of the variants of the wearable apparatus is a suit 25 (FIG. 11, 12) or a glove-manipulator 26 (FIG. 13, 14) made of modules 12 of different configuration that are linked with elastic cloth 27. It allows for fitting the electrodes tight against a body. Plates 12 are removable which allows replacing the elements in case of a breakdown and launder the suit when necessary.

On the inner side of the suit 25 and the glove-manipulator 26 that bears against the user's body provided are grooves for wire (not presented in the drawing) in which a common bus, ground cable, pulse wire and module wire are placed.

In another variant the wearable apparatus is a suit 29 (FIG. 15, 16) or a glove-manipulator 30 (FIG. 17, 18) that are made of elastic shell.

On the outer surface of the suit 29 and the glove-manipulator 30 slots 31, 32, 33, 34, 35 might be provided for installing various units.

Glove-manipulator 26 and 30 is joint to the suit 25 and 29 accordingly through slot 36 situated at the bottom the glove-manipulator 26 and 30 and slot 37 situated at the end of the suit sleeve 25 and 29 (FIG. 19).

When using the suit, a user will pass a calibration stage (determining peak characteristics of the pulses supplied by the generator to the electrodes and Peltier elements). This stage consists of two steps.

$1^{st}$—determining maximum impact by supplying minimal voltage.

$2^{nd}$—determining uncomfortable conditions through maximum impact.

After finding these two parameters, the suit can be used in the most comfortable range of sensations.

Discomfort can be determined using the kinematic parameters collecting elements. In case of discomfort, contractions of human muscles will become visible which will result in a change of joint angles that can be detected by compasses.

Measures of safety and health protection are provided in the suit. For this purpose all adjustable parameters have restrictions and the electrodes in the chest area are low-power.

Operation of the sensing system in the wearable apparatus in the invention is based on signal supply (with various amplitude, frequency, voltage and stress) to an electrode and Peltier elements. The signals affect nerve endings, which causes muscles or groups of muscles to contract and delivers the sense of warmth/cold. Signals are created by the pulse generator. The device for supplying electrical feedback pulses is a set of electronic switches. Electronic switches are responsible for supplying electrical pulse to the electrical pulse generating element. The computing device administers the parameters of the pulse generator and the electrical pulse generating device. It also performs coupling with an application program launched on a remote data processing unit.

Various combinations of turning the electrical pulse supplying elements on and off can recreate various realistic physical sensations from events occurring in a virtual space.

For example for transmitting a pull of gravity and modulating the mass of a virtual object which the user takes with his hand in a virtual space electrical pulses for transmitting tactile senses are supplied to the electrical pulse supplying elements situated on the palm side of the glove-manipulator, and for transmitting the weight of the object—to the electrical pulse supplying elements in the biceps-triceps area of the wearable apparatus.

The principle of primary and secondary (reflected) sensation is achieved by combining various options of turning the electrical pulse supplying elements in various body areas on and off. These sensations appear simultaneously or with a short-term delay of the secondary sensation. The principle is used for transmitting some types of impact, "penetration" in particular, when a virtual object not only touches the body but enters or pierces it.

The cascaded pulse distribution system does not necessarily imply decreasing signal distribution for creating smooth impact effect. Distribution might have a repeatable, ascending or descending pattern. This is vital for proper liquid, gas and fluidal mediums simulation.

A wave-like distribution is common among many physical phenomena. Implementing the cascaded pulse distribution principle in the invention offered allows for simulation of these phenomena and for creating special effects on its basis.

The close setting of electrical pulse supplying elements makes the cascaded distribution principle even more relevant. The accuracy of pulse transmitting increases thereby increasing the accuracy of fluid and gas medium simulation and the general quality if interference in a virtual environment.

Technologies proposed in the invention can be applied in entertainment industry, scientific research (simulation models), education (training programs and simulators), healthcare (treatment, prevention and research), defense industry (simulators, auxiliary devices), film industry, 911 (auxiliary devices), computer graphics industry, on the internet (multidimensional user connection, socially adoptive interface).

A suit for the interactive physiological and technological synchronization of a user with a virtual environment has been developed in accordance with the invention, its trade name is Tesla Suit.

The invention claimed is:

1. A method for interactive physiological and technological synchronization of a user with a virtual environment including:
   taking the user's biometric and/or kinematic parameters;
   transferring the user's biometric and/or kinematic parameters to an application program, generating feedback signals in the application program;
   transmitting the feedback signals to a computing device;
   processing the feedback signals and supplying feedback pulses invoking physical sensations in the user's nervous system through contact with the user's skin;
   wherein the feedback pulses are supplied using cascaded distribution of electrical pulses.

2. A wearable apparatus for interactive physiological and technological synchronization of a user with a virtual environment, the apparatus comprising:
   at least one sensor configured to take biometric and/or kinematic parameters of the user;
   a unit configured to couple with an application program to transfer the collected biometric and/or kinematic parameters to the application program, and receive feedback signals generated in the application program;
   an electric pulse generating unit configured to generate feedback pulses;
   a computing device configured to receive and process the received feedback signals, and generate correspondent instructions to the electric pulse generating unit; and
   pulse supplying elements configured to supply the feedback pulses to invoke physical sensations in the user's nervous system through contact with the user's skin, the feedback pulses being supplied using cascaded distribution of electrical pulses.

3. The wearable apparatus of claim 2, comprising at least one module containing said sensor and/or at least one of said pulse supplying elements, wherein the module is in the form of a flexible plate having an inner side and an outer side, and wherein the sensor and/or the at least one pulse supplying element is placed on the inner side of the flexible plate in contact with the user's skin when the wearable apparatus is in use.

4. The wearable apparatus of claim 2, comprising at least one slot for connecting at least one working unit selected from the group consisting of:
   said sensor;
   at least one of said pulse supplying elements;
   said computing device;
   said electric pulse generating unit;
   a power supply unit;
   said unit for coupling with the application program;
   a unit for coupling with a mobile device that functions as a display and/or a remote program control unit; and
   a localization unit.

5. The wearable apparatus of claim 4, comprising at least one module containing said sensor and/or the at least one pulse supplying element, wherein the module is in the form of a flexible plate having an inner side and an outer side, wherein the sensor and/or the at least one pulse supplying element is placed on the inner side of the flexible plate in contact with the user's skin when the wearable apparatus is in use, and wherein said slot is placed on the outer side of the plate.

6. The wearable apparatus of claim 4, wherein the localization unit is a GPS module, an echolocation module, a system of laser emitters, or a multi-modular 3D system.

7. The wearable apparatus of claim 4, wherein the unit for coupling with a mobile device is adjustable and removable.

8. The wearable apparatus of claim 3, wherein the module is removable.

9. The wearable apparatus of claim 3, wherein the unit for coupling with the application program is a wireless communication unit.

10. The wearable apparatus of claim 3, wherein the unit for coupling with the application program is a wired communication unit.

11. The wearable apparatus of claim 2, wherein said apparatus is a piece of clothing.

12. The wearable apparatus of claim 11, wherein the piece of clothing is formed of modules linked with each other by an elastic material.

13. The wearable apparatus of claim 2, wherein said apparatus is an elastic shell capable of adjusting to fit the user's body, wherein a side of said shell, being in contact with the user's skin in use, is electrically conductive, and wherein the sensor and/or least one of said pulse supplying elements is placed on said side of the elastic shell.

14. The wearable apparatus of claim 2, wherein the unit for coupling with the application program is a wireless communication unit.

15. The wearable apparatus of claim 2, wherein the unit for coupling with an application program is a wired communication unit.

16. The wearable apparatus of claim 2, wherein the pulse supplying elements are electrodes.

17. The wearable apparatus of claim 16, wherein the feedback pulses are supplied such that a primary electrical pulse at a first electrode contact point has a maximum power, and a second electrical pulse at a second electrode contact point has a lower power which the computing unit is configured to calculate depending on the power of the primary electrical pulse.

18. The wearable apparatus of claim 17, wherein the computing unit is configured to calculate the power of the second electrical pulse depending on the power of the primary electrical pulse and a pre-programmed value held in memory accessible to the computing unit.

19. A non-transitory computer readable storage media comprising a computer program with executable instructions that, when executed on a computing unit, implements a method for interactive physiological and technological synchronization of a user with a virtual environment, the method comprising:
   receiving from at least one sensor the user's biometric and/or kinematic parameters;
   transferring the user's biometric and/or kinematic parameters to an application program;
   receiving from the application program feedback signals generated in the application program;
   processing the feedback signals and generating correspondent instructions to an electric pulse generating unit to supply feedback pulses invoking physical sensations in the user's nervous system through contact with the user's skin, the feedback pulses being supplied using cascaded distribution of electrical pulses.

20. The non-transitory computer readable storage media of claim 19, wherein the feedback pulses are supplied such that a primary electrical pulse at a first electrode contact point has a maximum power, and a second electrical pulse at a second electrode contact point has a lower power which the computer program is configured to calculate depending on the power of the primary electrical pulse.

\* \* \* \* \*